June 4, 1940.  R. L. ENGLE  2,203,294
NAIL FOR FASTENING SHEETING
Filed March 16, 1939
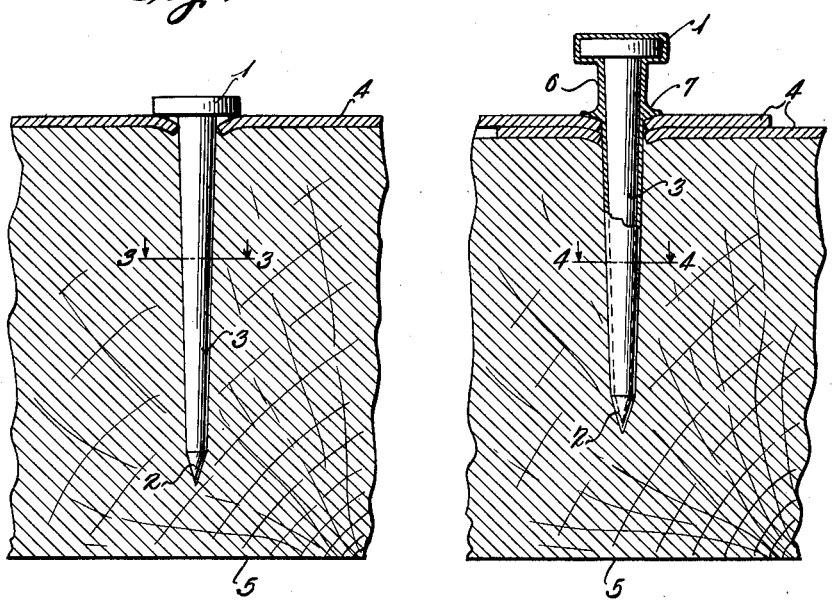
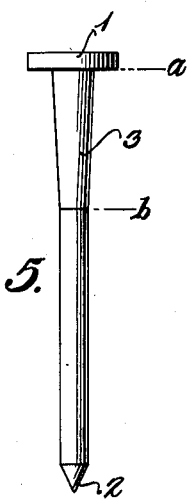
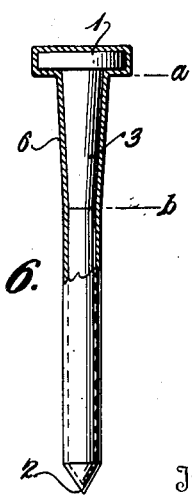
Inventor
Ralph L. Engle
By Bacon & Thomas
Attorneys Patented June 4, 1940

2,203,294

UNITED STATES PATENT OFFICE 2,203,294

NAIL FOR FASTENING SHEETING

Ralph L. Engle, Oden, Mich.

Application March 16, 1939, Serial No. 262,294

4 Claims. (Cl. 85—10)

This invention is directed to a nail for fastening sheeting such as metallic and non-metallic roofing or sheathing upon a wooden base.

The object of this invention is to provide a nail which will form a very effective seal between the nail shank and the hole driven through the sheet element as well as between the head of the nail and the hole to effectively prevent the seepage of moisture through the nail holes after the nail is driven into place.

In the drawing:

Figure 1 is an elevation view of one form of the nail driven through a sheet element and a wooden base;

Figure 2 is an elevation of another form of the nail partly broken away to show a coating on the body of the nail, and partly driven through the sheet material.

Figures 3 and 4 show the cross-sections of the nails in Figures 1 and 2 taken along the lines 3—3 and 4—4, respectively;

Figure 5 shows another modification of a nail according to my invention; and

Figure 6 shows an elevation of another modification, partly broken away to show a coating on the body of the nail.

In Figure 1, the nail consists of a head 1 and point 2, the shank 3 of which is shown decreasing in cross-section from the head toward the point. The sheet element is shown at 4 and the wooden base at 5. The general overall dimensions of this nail are practically the same as an ordinary roofing nail, excepting that instead of having a straight shank, the shank is tapered converging from the head in a direction toward the point. In Figure 3 the cross-section of the nail in Figure 1 is shown as circular. Any non-angular cross-section may be employed such as oval or square with rounded corners. It is desirable to avoid sharp angles in the cross-section for the reasons which shall be explained later.

Figure 2 is a preferred form of the invention and shows a nail similar to that in Figure 1 but having coating 6 of scuffable soft material such as lead, tin, or equivalent material over the whole nail including the head or merely on the shank portion 3. I have found that non-metallic coatings could also be used instead of soft metal of a scuffable quality which would function as presently described. The coating material used, in any event, should therefore have the approximate degree of hardness and flow resistance of said soft metals, so that when the nail is driven into a harder metal such as ferrous sheet roofing there will be a yielding of the coating material not so much from a flow action as from a shaving, scraping or scuffing action.

The function of the tapered shank is evident when one studies the action during the course of driving, of an ordinary straight shanked nail in passing through the hole in a sheet element such as roofing. At the outset, in driving, a straight shanked nail forms a hole of equal diameter to the diameter of the nail in the sheet element. As the nail is driven down to the head, the friction between the straight shank and the nail hole tends to enlarge the hole and increase the space between the straight shank and the edges of the hole. This enlargement of the nail hole allows moisture such as rain and puddles, in the case of a roof, to seep down between the nail and the sheet element into the interior of the building. To overcome this defect, straight shanked nails of various types having lead heads have been placed on the market, the function of the lead head being to conform itself or spread around the nail hole to seal the leak between the shank and the nail hole. Such lead headed nails are only effective when the head is in absolute close contact with the sheet element. If, due to expansion and contraction of the metal, the lead head should be loosened, the seal between the nail head and the sheet element such as roofing will be broken.

A tapered nail such as described overcomes this difficulty in the following manner: As the tapered nail is driven from point to head, the shank is continuously expanding against the edge of the nail hole in the sheeting element to tightly seal the hole against any moisture between the hole and nail. It is obvious that it is only necessary to give the nail a very slight taper to obtain this result.

In the form shown in Figure 2, the scuffable coating 6 supplements the action of the taper in the following manner: As the nail is driven through relatively hard sheet material such as metallic roofing, the metal sheeting at the edge of the hole scrapes or scuffs fine shavings as shown at 7 off of the relatively softer coating due to the extreme pressure caused by the expansive action between the tapered nail shank and the edge of the nail hole, thus causing a plug or deposit of finely divided soft material to build up under the head which is further compressed into the seal by the head of the nail when the nail is finally driven into place. A further function of the coating in combination with the tapered shank is the tendency of the soft material under the described extreme pressures to conform itself to the exact shape of the hole when the edges are inclined to break irregularly and thus fill in the voids produced between such a ragged edge and the nail shank. It is recognized that roofing nails of the straight shanked type are well known in the art having corrosion resistant coatings but such nails do not progressively expand against the edge of the hole when driven and thus cannot create the extreme pressure to shave off the soft metal progressively as in the case of a tapered nail.

Of the materials which have this property of scuffing off, metallic lead is particularly well suited for this purpose.

In illustrating the cross sections of the nails shown in Figures 3 and 4, we do not intend to be limited to a circular cross-section, but as above stated, the nail could be formed of any non-angular cross-section. Angular cross-sections should be avoided inasmuch as sharp corners on the shank will tend to tear or cut through the sheet material at the corners making a ragged edge on the hole and thus create voids between the nail hole and the nail shank whereas a smooth curved surface of the shank will smoothly and uniformly expand the edge of the hole while being driven.

In Figure 5 a nail is shown in which only a portion of the shank is slightly tapered from the head through a distance *a* to *b*, which is shown for the purpose of example about one third of the entire length of the shank. For the purposes of this invention, any substantial portion of the shank from the head down could be slightly tapered and the remainder of the shank could be of uniform diameter.

Figure 6 shows a nail having a shank similar to that in Figure 5 but having a coating 6 over the entire body of the nail. In this form the essential portion to be coated is in the zone *a* to *b*.

I claim:

1. A nail having the characteristics of a roofing nail capable of perforating and fastening sheeting, said nail having a head, a shank, and a point, said shank having a non-angular cross-section and every cross-sectional diameter of said shank decreasing continuously from the head to the point.

2. A nail having the characteristics of a roofing nail capable of perforating and fastening sheeting, said nail having a head, a shank, and a point, said entire shank having a circular cross-section and the cross-sectional diameter of a substantial portion of said shank decreasing gradually from the head toward the point.

3. A nail capable of perforating and fastening metal sheeting having a head, a shank and a point, said shank having a non-angular cross-section, every cross-sectional diameter of said shank decreasing continuously from the head to the point and said shank coated with a material having the degree of hardness and flow resistance like that of lead or tin.

4. A nail capable of perforating and fastening metal sheeting, said nail having a head, a shank and a point, said shank having a non-angular cross-section, every cross-sectional diameter of a substantial portion of said shank decreasing gradually from the head toward the point and a coating on said shank of a material having the degree of hardness and flow resistance like that of lead or tin.

RALPH L. ENGLE.